(12) United States Patent
Sasaki et al.

(10) Patent No.: US 9,545,846 B2
(45) Date of Patent: Jan. 17, 2017

(54) VEHICULAR PEDAL DEVICE

(71) Applicant: HONDA MOTOR CO., LTD., Minato-ku, Tokyo (JP)

(72) Inventors: Takuro Sasaki, Wako (JP); Ayumu Yamaguchi, Wako (JP); Shinji Oka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/435,299

(22) PCT Filed: Oct. 24, 2013

(86) PCT No.: PCT/JP2013/078854
§ 371 (c)(1),
(2) Date: Apr. 13, 2015

(87) PCT Pub. No.: WO2014/065379
PCT Pub. Date: May 1, 2014

(65) Prior Publication Data
US 2015/0274014 A1   Oct. 1, 2015

(30) Foreign Application Priority Data

Oct. 25, 2012 (JP) ................................. 2012-235877

(51) Int. Cl.
*B60K 23/02* (2006.01)
*G05G 1/30* (2008.04)
*G05G 1/01* (2008.04)

(52) U.S. Cl.
CPC ................ *B60K 23/02* (2013.01); *G05G 1/01* (2013.01); *G05G 1/30* (2013.01)

(58) Field of Classification Search
CPC ............. B60T 7/04; B60T 11/10; B60T 11/16; B60T 11/18; G05G 1/01; G05G 1/30; G05G 1/46; F16D 25/12; F15B 7/08
See application file for complete search history.

(56) References Cited

U.S. PATENT DOCUMENTS 6,360,631 B1 * 3/2002 Wortmann ............... G05G 1/30
                                                  267/209
6,367,886 B1 * 4/2002 Shaw ...................... B60T 7/042
                                                  188/151 A
6,454,075 B1 * 9/2002 Leuschke ............... B60K 23/02
                                                  192/85.6

(Continued)

FOREIGN PATENT DOCUMENTS

JP   58-005653 Y2    1/1983
JP   03-028925 U     3/1991
JP   04-293660 A    10/1992

*Primary Examiner* — Paul N Dickson
*Assistant Examiner* — Timothy Wilhelm
(74) *Attorney, Agent, or Firm* — Carrier Blackman & Associates, P.C.; William D. Blackman; Jeffrey T. Gedeon (57) ABSTRACT

Provided is a vehicular pedal device, wherein a master cylinder, which is connected to a clutch pedal via a piston, and which generates hydraulic pressure via a movement of the clutch pedal, is positioned further toward a passenger compartment side of a dash panel which separates a drive source mounting chamber from the passenger compartment, said vehicular pedal device comprising a pedal support bracket which supports the clutch pedal upon the dash panel. The pedal support bracket configures a cylinder part which houses operating oil of the master cylinder.

6 Claims, 5 Drawing Sheets

(56) References Cited

U.S. PATENT DOCUMENTS

| | | | |
|---|---|---|---|
| 6,679,366 B2 * | 1/2004 | Tulaczko | F16D 25/12 |
| | | | 192/99 S |
| 6,719,083 B2 * | 4/2004 | Ono | B60K 23/02 |
| | | | 180/274 |
| 7,396,183 B2 * | 7/2008 | Dona Contero | B60T 7/06 |
| | | | 403/122 |
| 9,075,427 B2 * | 7/2015 | Muraji | B60K 26/021 |
| 2003/0164057 A1 * | 9/2003 | Buckley | B60K 26/02 |
| | | | 74/512 |

* cited by examiner

FIG. 5

VEHICULAR PEDAL DEVICE

TECHNICAL FIELD

The present invention relates to a vehicular pedal device.

BACKGROUND ART

As a clutch pedal device having a master cylinder, for a clutch pedal, disposed on the vehicle compartment side, there is proposed a pedal device in which a master cylinder is disposed such as to be located between a pair of side plates as a pedal bracket (for example, see Patent Literature 1).

BACKGROUND ART DOCUMENT

Patent Literature

Patent Literature 1: JP 58-005653 Y

DISCLOSURE OF THE INVENTION

Problem to be Solved by the Invention

However, in the clutch pedal device described in Patent Literature 1, a master cylinder is fitted to the front plate out of fitting plates (pedal bracket). As a master cylinder and a pedal bracket are separately arranged in such a manner, there was a problem of an increase in the number of components.

The present invention solves the above-described conventional problem, and an object of the invention is to provide a vehicular pedal device that enables decreasing the number of components.

Means for Solving the Problem

A first aspect of this disclosure provides a vehicular pedal device in which a master cylinder is connected to a pedal through a piston to generate hydraulic pressure by movement of the pedal, and is disposed on a vehicle compartment side of a dash panel provided between a driving force source mounting room and a vehicle compartment, including: a pedal support bracket for supporting the pedal on the dash panel, wherein a cylinder portion comprises the pedal support bracket, and stores hydraulic oil of the master cylinder.

By this arrangement, as the pedal support bracket constructs the cylinder portion of the master cylinder, it is possible to decrease the number of components, compared with a case of separately arranging a cylinder portion and a pedal support bracket. As a result, the weight of the vehicular pedal device can be reduced.

In a second aspect of this disclosure the pedal support bracket includes: a pair of side plate portions which sandwich the pedal and support a rotation shaft of the pedal; and a connecting portion for connecting the pair of side plate portions, wherein the cylinder portion is arranged as at least a part of the connecting portion.

By this arrangement, as the cylinder portion is arranged as a part of the connecting portion for connecting the pair of side plate portions of the pedal support bracket, it is possible to improve, by the cylinder portion, the stiffness of the side plate portions supporting the pedal. Accordingly, both reducing the weight by decreasing the number of components and improving the stiffness can be attained.

In a third aspect of this disclosure the connecting portion includes plural plate shaped portions whose both end portions are connected to the pair of side plate portions respectively; and the cylinder portion is formed substantially in a circular cylindrical shape, and side surfaces of the cylinder portion are connected across the plural plate shaped portions, or are integrated with the plural plate shaped portions.

By this arrangement, the side surfaces (circumferential surfaces) of the cylinder portion in a circular cylindrical shape are connected across plural plate shaped portions, or the side surfaces (circumferential surfaces) of the cylinder portion in a circular cylindrical shape are integrated, it is thereby possible for the cylinder portion to contribute as a reinforcing member for the plural plate shaped portions, wherein the stiffness of the pedal support bracket can be improved even in a state of decreasing the number of components, more than in a case of separately providing a cylinder portion and a pedal support bracket.

In a fourth aspect of this disclosure the cylinder portion is spaced apart from the side plate portions.

By this arrangement, as an extension pipe of a pipe in which hydraulic oil flows can be supported between the pipe and the cylinder portion, it is possible to improve the durability of the pipe.

In a fifth aspect of this disclosure the cylinder portion is provided with an opening portion that is opened downward in a vehicle upper and lower direction; the piston is inserted into the opening portion and is slidable with respect to the cylinder portion; and the vehicular pedal device includes a connecting rod for connecting an end portion of the piston, the end portion being on a side opposite to a direction in which the piston is inserted into the cylinder portion, and an upper portion of the pedal.

By this arrangement, even if the pedal support bracket constructs the cylinder portion, it is possible to press the piston into the cylinder portion through the connecting rod, accompanying a stroke of the clutch pedal. In such a manner, it is possible to make a function as a master cylinder effective.

In a sixth aspect of this disclosure the connecting rod has spherical portions at both ends thereof; one end portion of the connecting rod, the end portion being inserted into the cylinder portion, is held by a recessed portion of the piston; and another end portion of the connecting rod, the end portion being on the side opposite to the direction in which the connecting rod is inserted into the cylinder portion, is slidably held by a rod holding member provided on the pedal.

By this arrangement, as the connecting rod can oscillate between the piston and the pedal when the pedal oscillates, the connecting rod can follow the rotation of the pedal, and the rotation of the pedal can be converted into an expansion and contraction movement of the piston.

In a seventh aspect of this disclosure a projecting portion is provided at an upper end of the pedal; and the projecting portion touches a side surface of the cylinder portion at an initial position of the pedal in order to restrict rotation of the pedal.

By this arrangement, the projecting portion of the pedal touches the side surface of the cylinder portion so that the rotation of the pedal is restricted in a state that the pedal is at the initial position. Thus, it is not necessary to provide a stopper (restricting member) or the like as a separate member to the pedal support bracket like a prior art, and accordingly, it is possible to decrease the number of components even more, and reduce the weight.

In an eighth aspect of this disclosure the vehicular pedal device included: a return spring for returning the pedal to the initial position, wherein the return spring is supported between the projecting portion and the side plate portion.

By this arrangement, it is possible to easily make a layout that enables return springs to generate an urging force returning the pedal to the initial position in a region between the initial position of the pedal and the position where the projecting portion of the pedal touches the side surface of the cylinder portion and the rotation of the pedal is restricted.

Advantage of the Invention

According to the present invention, it is possible to provide a vehicular pedal device that enables decreasing the number of components.

EMBODIMENTS FOR CARRYING OUT THE INVENTION

In the following, a clutch pedal device 1 (vehicular pedal device) according to an embodiment of the present invention will be described in detail, referring to FIGS. 1 to 4. Incidentally, all of FIGS. 1 to 4 show a state that a clutch pedal 20 is at an initial position (a state that the clutch pedal 20 is not pedaled by a driver). In FIG. 4, a state in which the clutch pedal 20 is pedaled is shown by alternate long and two short dashes lines.

Figure 1:
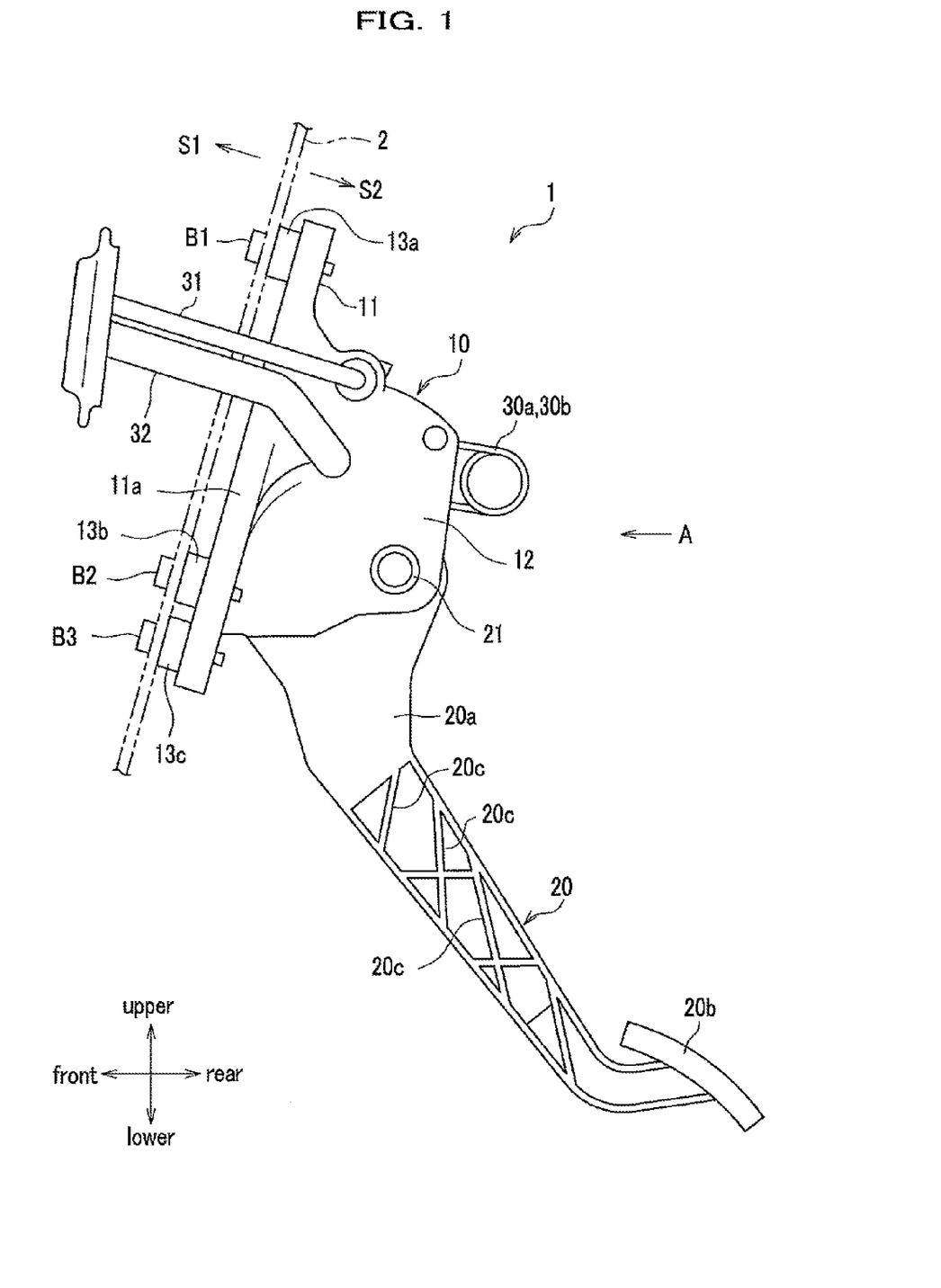
FIG. 1 is a side view showing a vehicular pedal device according to an embodiment.

As shown in FIG. 1, the clutch pedal device 1 is mounted on a vehicle equipped with a manual transmission, and includes a pedal support bracket 10, a clutch pedal (pedal) 20, return springs 30a, 30b, and the like.

The pedal support bracket 10 is disposed on the vehicle compartment S2 side of a dash panel 2 partitioning between a driving force source mounting room (for example, an engine room) S1, in which a driving force source such as an engine is mounted, and the vehicle compartment S2, and is fixed to the dash panel 2 by three bolts B1, B2 and B3. Incidentally, the pedal support bracket 10 can be formed by casting of a metal material, for example, iron.

Further, the pedal support bracket 10 includes a base portion 11 extending in a direction along the dash panel 2, a pair of side plate portions 12, 13 (see FIG. 2 for the side plate portion 13) which are standing from the base portion 11 in a direction going away from the dash panel 2, and a connecting portion 14 (see FIG. 2) connecting the pair of side plate portions 12, 13. The base portion 11 has a surface along the dash panel 2, and is provided with bosses 13a, 13b, 13c projecting from positions of fixing by the bolts B1, B2, B3 toward the dash panel 2. Thus, the pedal support bracket 10 is fixed in a state that only the bosses 13a, 13b, 13c touch the dash panel 2.

The clutch pedal 20 includes an arm portion 20a and a pad portion 20b, wherein the top portion of the arm portion 20a is rotatably supported by the pedal support bracket 10 through a connecting pin (rotation shaft) 21

In the initial state of the clutch pedal 20 shown in FIG. 1, the arm portion 20a is extending with inclination such that the lower end thereof is located at the most posterior position and the upper end thereof is located at the most anterior position. Further, the inside of the arm portion 20a has a shape in which plural limbs 20c, 20c, 20c, . . . are combined to reduce the weight of the clutch pedal 20, while ensuring the strength of the clutch pedal 20.

Pipes 31, 32, in which hydraulic oil flows, are extending from the left side surface of the pedal support bracket 10. For example, a pipe 31 is extending to a slave cylinder (not shown) on the clutch main body (not shown) side, and a pipe 32 is extending to a reservoir tank (not shown)

Figure 2:
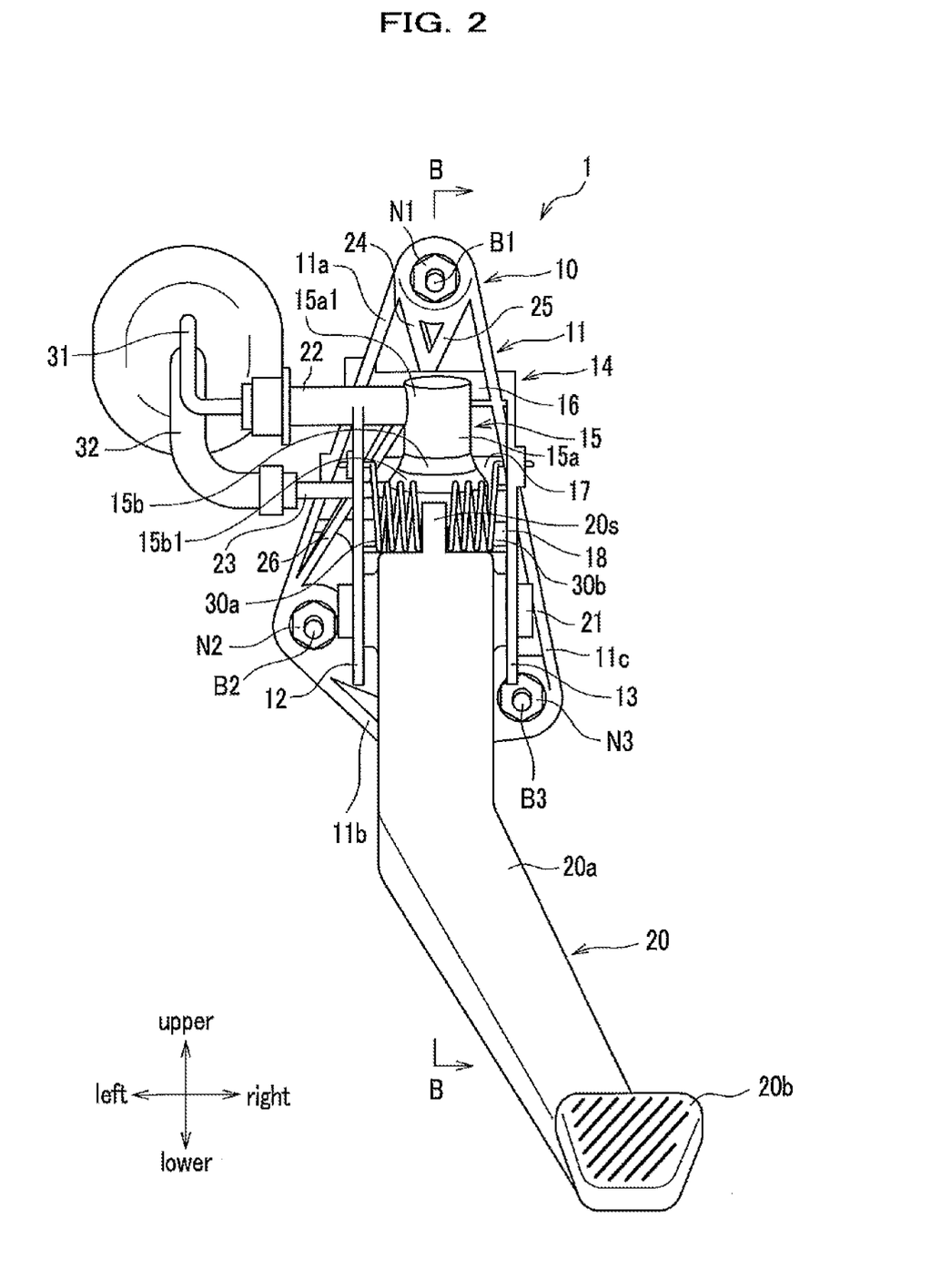
FIG. 2 is an arrow view in direction A in FIG. A.

As shown in FIG. 2, the base portion 11 of the pedal support bracket 10 is substantially in a triangle shape substantially in a front view such that the upper portion, the left side portion, and the right side portion of the clutch pedal 20 substantially form the substantial corners of the substantial triangle.

Further, the base portion 11 has outer circumferential side limbs 11a, 11b, 11c connecting the respective corners. The outer circumferential side limb 11a connects the position of the bolt B1 and the position of the bolt B2. The outer circumferential side limb 11b connects the position of the bolt B2 and the position of the bolt B3. The outer circumferential side limb 11c connects the position of the bolt B3 and the position of the bolt B1.

Still further, at the respective corner portions of the base portion 11, there are arranged nuts N1, N2, N3, and the tip end portions of the bolts B1, B2, B3, which are penetrating through the dash panel 2 and the bosses 13a, 13b, 13c from the driving force source mounting room S1 side, are screw-engaged with the nuts N1, N2, N3.

The paired side plate portions 12, 13 are disposed in parallel with each other, sandwiching the upper portion of the clutch pedal 20 from the left and right sides, and are rotatably supported through the connecting pin 21.

The side plate portion 12 is arranged such that the upper end portion thereof and the substantially central portion of the outer circumferential side limb 11a are connected with each other. In other words, the entire side plate portion 12 is located inside the outer circumferential side limb 11a.

The side plate portion 13 is formed such as to intersect and connect with the outer circumferential side limb 11c. In other words, the side plate portion 13 is arranged such that the upper portion thereof is located outside the outer circumferential side limb 11c while the lower portion thereof is located inside the outer circumferential side limb 11c.

As shown in FIG. 2, the connecting portion 14 connects the side plate portions 12, 13 and is formed by a cylinder portion 15 and limbs (plate shaped portions) 16, 17.

The cylinder portion 15 is formed substantially in a circular cylindrical shape and is disposed between the side plate portions 12, 13 with the axial direction thereof vertical. The cylinder portion 15 is in a shape of combination of a cylindrical portion 15a in a cylindrical shape and a substantially conically and trapezoidally shaped portion (skirt shaped portion) 15b with a larger diameter than that of the cylindrical portion 15a. Incidentally, in the present embodiment, the maximum diameter portion (the maximum outer diameter portion) of the cylinder portion 15 is formed shorter than the distance between the side plate portions 12, 13 so that the cylinder portion 15 does not touch the side plate portions 12, 13.

A limb 16 is formed substantially in a rectangular shape such as to extend in the left and right direction, and is connected with the outer circumferential side limbs 11a, 11c such as to straddle them. Further, the limb 16 connects the upper end portions of the paired side plate portions 12, 13.

Still further, the limb 16 is extending from the base portion 11 toward the cylinder portion 15 side and is connected to the side surface 15a1 of the cylinder portion 15 (cylindrical portion 15a).

A limb 17 is formed substantially in a rectangular shape and is extending along the left and right direction to connect the paired side plate portions 12, 13, below the limb 16. Further, the limb 17 is extending in parallel with the limb 16 from the base portion 11 toward the cylinder portion 15 side to be connected with the side surface 15b1 of the cylinder portion 15 (the substantially conically and trapezoidally shaped portion 15b).

In such a manner, the side surfaces 15a1, 15b1 of the cylinder portion 15 are connected with each other such as to straddle the plural limbs 16, 17 connecting the paired side plate portions 12, 13.

Further, the pedal support bracket 10 is provided with a limb 18 below the limb 17. The limb 18 is formed, extending in the left and right direction to connect the paired side plate portions 12, 13. Further, the limb 18 has a shape extending in parallel with the limb 17 from the base portion 11 without vertically overlapping with the later-described opening portion 15t (see FIG. 4) of the cylinder portion 15.

Still further, the pedal support bracket 10 includes a limb 24 connecting one end of the outer circumferential side limb 11a and the limb 16, a limb 25 connecting one end of the outer circumferential side limb 11c and the limb 16, and a limb 26 connecting the other end of the outer circumferential side limb 11a and the limb 16. Incidentally, this arrangement of limbs in the present embodiment is one example and the arrangement of limbs is not limited to the present embodiment.

As shown in FIG. 2, return springs 30a, 30b have a function to return the clutch pedal 20 to the initial position, and are disposed on the left and the right sides between the paired side plate portions 12, 13.

The return spring 30a is supported at one end thereof by the side plate portion 12 and is supported at the other end thereof by a projecting portion 20s formed at the upper end of the clutch pedal 20. The return spring 30b is supported at one end thereof by the side plate portion 13 and is supported at the other end thereof by the projecting portion 20s.

Figure 3:
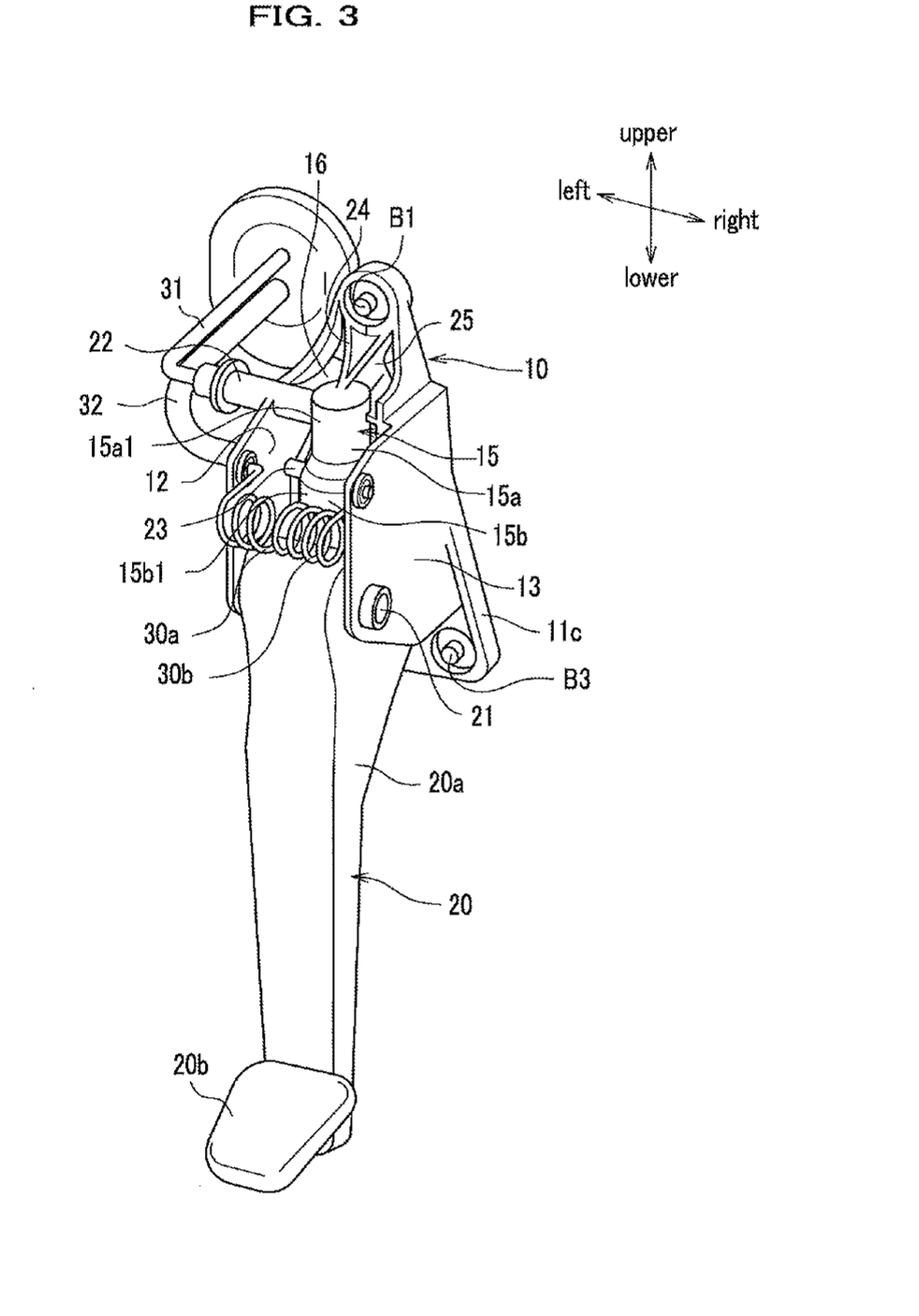
FIG. 3 is a perspective view showing the vehicular pedal device in the above-described embodiment.
Figure 4:
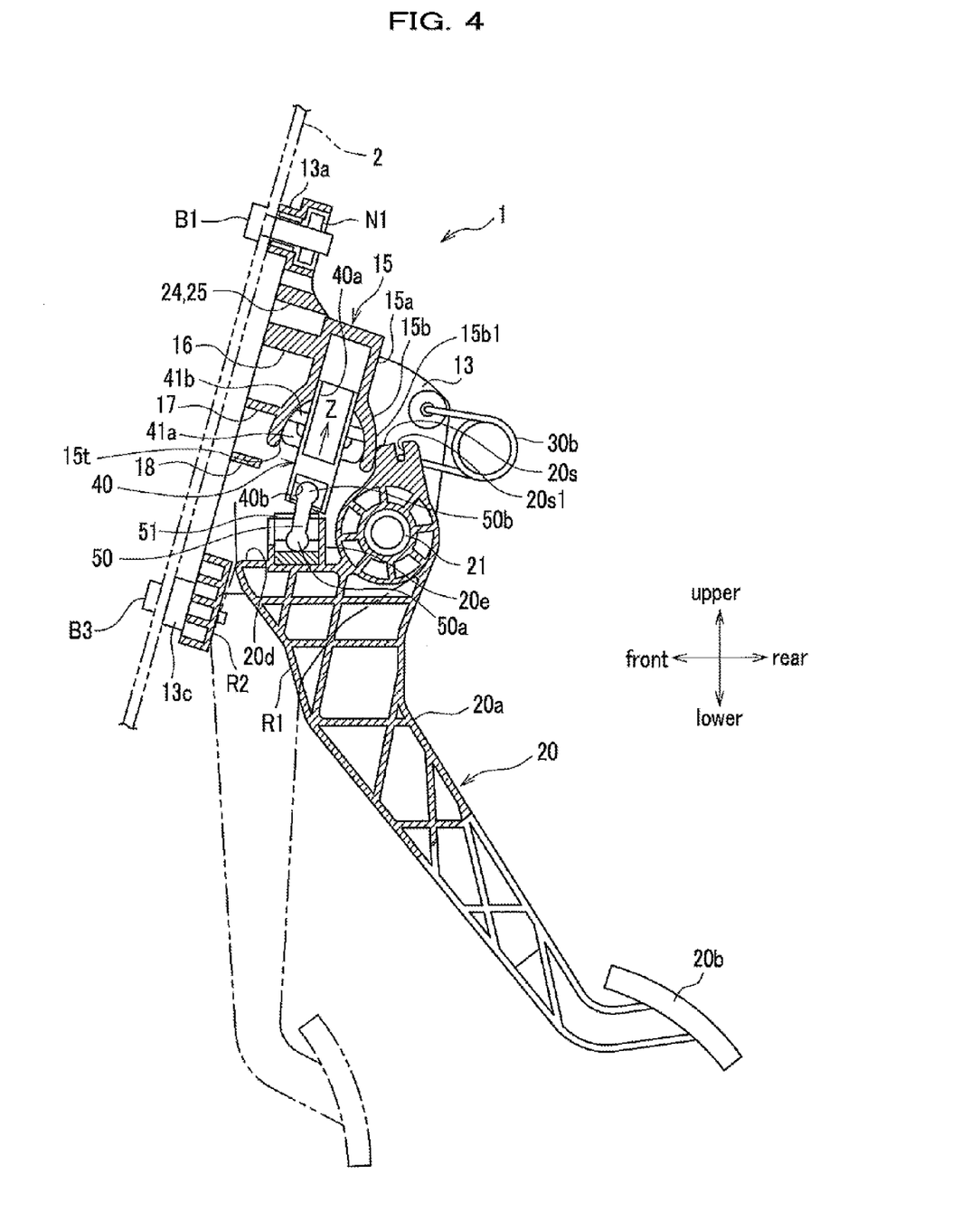
FIG. 4 is a cross-sectional view taken along line B-B in FIG. 2.

As shown in FIG. 3, an extension pipe 22 connected with the pipe 31 is formed on the side surface (circumferential surface) 15a1 of the cylinder portion 15 (cylindrical portion 15a). The extension pipe 22 is extending leftward from the upper end of the cylinder portion 15, penetrating through the side plate portion 12. Incidentally, the extension pipe 22 is integrally formed with the side plate portion 12.

Further, an extension pipe 23 connected with the pipe 32 is formed on the side surface (circumferential surface) 15b1 of the cylinder portion 15 (the substantially conically and trapezoidally shaped portion 15b). The extension pipe 23 is extending leftward from the lower portion of the cylinder portion 15, penetrating through the side plate portion 12. Incidentally, the extension pipe 23 is also integrally formed with the side plate portion 12.

The above-described limbs 24, 25 are not only connected with the limb 16 but also connected with the upper portion of the cylinder portion 15.

As shown in FIG. 4, the cylinder portion 15 is provided with the opening portion 15t opening downward in the upper and lower direction of the vehicle. The opening portion 15t is located between the limb 17 and the limb 18. Further, a piston 40 is inserted through the opening portion 15t so that the piston 40 can slide inside the cylindrical portion 15a of the cylinder portion 15.

The piston 40 is formed in a circular cylindrical shape, and includes a recessed portion 40a opening toward the cylindrical portion 15a (upward) and a recessed portion 40b opening toward the opposite side (downward) opposite to the recessed portion 40a. Incidentally, FIG. 4 shows a state that the piston 40 protrudes from the cylinder portion 15 to the outermost side.

Further, the piston 40 is sealed by plural piston packings 41a, 41b in a state of being inserted in the cylinder portion 15. Incidentally, in the present embodiment, a master cylinder is formed by the cylinder portion 15, the piston 40, and the piston packings 41a, 41b.

A recessed portion 20e opening, anterior (the dash panel 2 side) to the rotation shaft provided with the connecting pin 21, toward the piston 40 is integrally formed at the upper portion 20d of the clutch pedal 20. A rod holding member 51 for oscillatably holding a later-described connecting rod 50 is attached inside the recessed portion 20e.

The connecting rod 50 connects the clutch pedal 20 and the piston 40 and converts the rotational movement of the clutch pedal 20 into axial movement of the piston 40. The connecting rod 50 is a rod-shaped member having spherical portions 50a, 50b at the both ends thereof. The spherical portion 50a at one end of the connecting rod 50 is held by the rod holding member 51 while the spherical portion 50b at the other end of the connecting rod 50 is held by the recessed portion 40b of the piston 40. Incidentally, the rod holding member 51 is provided with move-off preventing means (not shown) for preventing the spherical portion 50a from moving off from the rod holding member 51 when the clutch pedal 20 returns to the initial position. Further, the recessed portion 40b is provided with a move-off preventing means (not shown) for preventing the spherical portion 50b from moving-off from the recessed portion 40b when the clutch pedal 20 returns to the initial position.

As shown in FIG. 4, the projecting portion 20s provided at the upper end of the clutch pedal 20 touches the side surface 15b1 of the cylinder portion 15 (the substantially conically and trapezoidally shaped portion 15b) in a state that the clutch pedal 20 is at the initial position, and the rotational movement of the clutch pedal 20 is thereby restricted. Further, the other end of the return spring 30b is supported by the projecting portion 20s. (The return spring 30b is supported similarly.)

The movement of the clutch pedal device 1 will be described below, referring to FIG. 4.

If the pad portion 20b of the clutch pedal 20 is pedaled by a driver, the arm portion 20a of the clutch pedal 20 rotates against the elastic returning force of the return springs 30a, 30b with the connecting pin 21 as the fulcrum point, and the arm portion 20a presses the connecting rod 50 substantially upward. Then, the piston 40 of the master cylinder is pressed into the cylinder portion 15, and a hydraulic pressure for releasing the clutch is thereby generated. Further, herein, as shown by alternate long and two short dashes lines in FIG. 4, the front surface R1 of the arm portion 20a of the clutch pedal 20, the front surface R1 being close to the pedal support bracket 10, touches the lower end portion R2 of the pedal support bracket 10, and the rotational movement of the clutch pedal 20 is thereby restricted.

Still further, if the driver takes off the pedal effort by moving foot away from the pad portion 20b, the clutch pedal 20 rotationally returns by the elastic returning force of the return springs 30a, 30b, and the projecting portion 20s of the clutch pedal 20 touches the side surface 15b1 of the cylinder portion 15 so that the rotational movement of the clutch pedal 20 is stopped at the initial position. The piston 40 is pulled in the direction of moving off from the cylinder portion 15 through the connecting rod 50 by the returning movement of the clutch pedal 20, and thus returns into the initial state.

As has been described above, the clutch pedal device 1 in the present embodiment is provided with the pedal support bracket 10 supporting the clutch pedal 20 on the dash panel 2, wherein as the pedal support bracket 10 constructs the cylinder portion 15 of the master cylinder, the cylinder portion 15 storing hydraulic oil, it is possible to decrease the number of components, compared with a case of separately arranging a cylinder portion 15 and a pedal support bracket 10, As a result, the weight of the clutch pedal device 1 can be reduced.

Further, in the present embodiment, the pedal support bracket 10 is provided with the pair of side plate portions 12, 13 which support the clutch pedal 20 through the connecting pin 21, sandwiching the clutch pedal 20, and the cylinder portion 15 is arranged as at least a part of the connecting portion 14 for connecting the pair of side plate portions 12, 13. In such a manner, as the cylinder portion 15 is arranged as a part of the connecting portion 14 for connecting the pair of side plate portions 12, 13 of the pedal support bracket 10, it is possible to improve, by the cylinder portion 15, the stiffness of the side plate portions 12, 13 supporting the clutch pedal 20, and both reducing the weight by decreasing the number of components and improving the stiffness can be attained.

Figure 5:
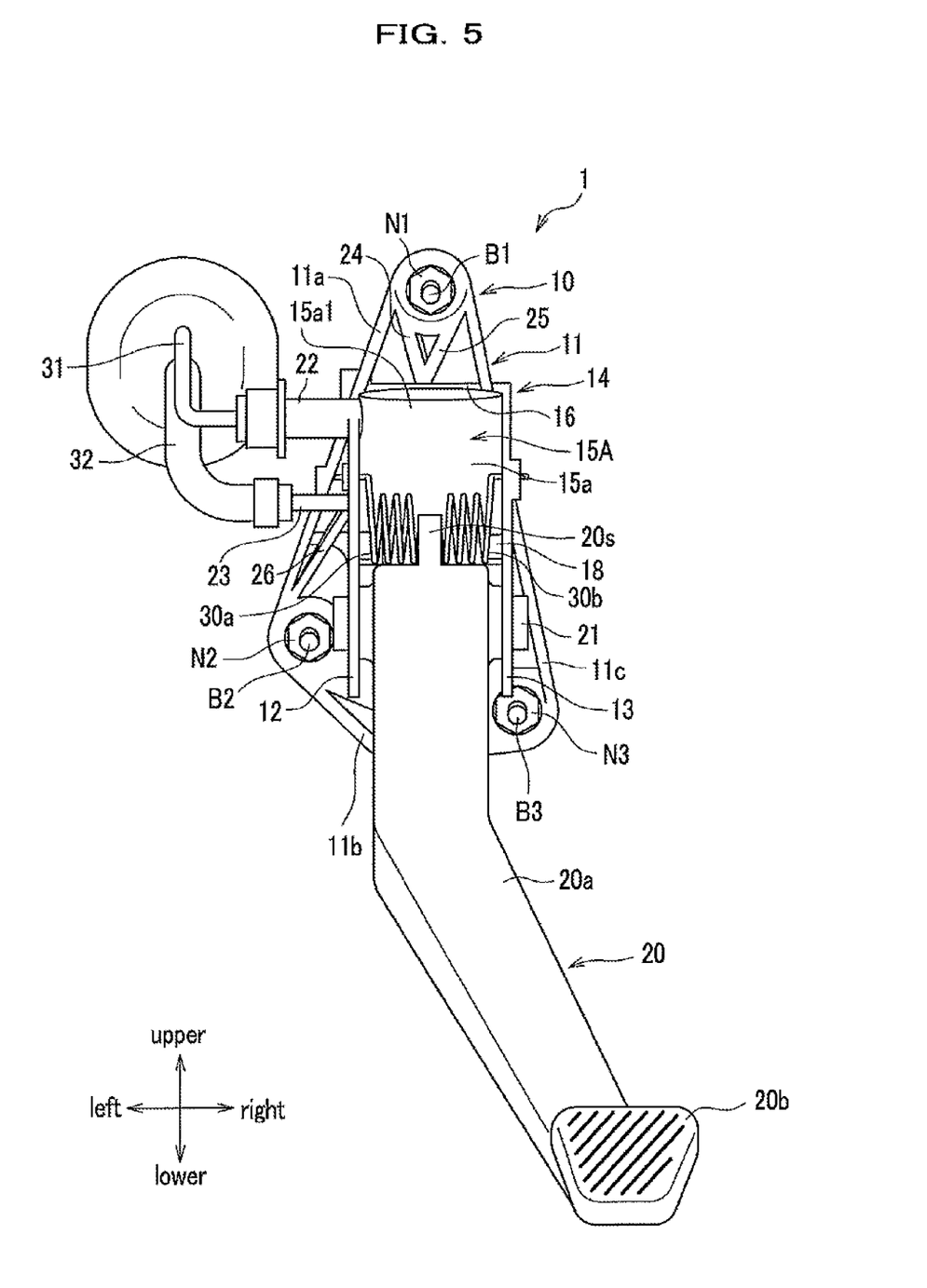
FIG. 5 is an arrow view corresponding to direction A in FIG. 1, showing a vehicular pedal device in a modified example of the above-described embodiment.

Incidentally, the present embodiment has been described taking an example (see FIG. 2 and FIG. 3) in which the side surfaces 15a1, 15b1 of the cylinder portion 15 are connected to the pair of side plate portions 12, 13 through limbs 16, 17, however, the invention is not limited thereto. For example, as shown in FIG. 5, arrangement may be made such that a cylinder portion 15A has a diameter larger than that of the above-described cylinder portion 15 so that the side surface (circumferential surface) 15a1 of the cylinder portion 15A is directly connected with (supported by) a pair of side plate portions 12, 13 disposed on the left and right sides of the cylinder portion 15A, or arrangement may be made such that the cylinder portion 15A and the pair of side plate portions 12, 13 are integrally formed. Further, if the cylinder portion 15A is one that can be directly connected to the side plate portions 12, 13 (one that can be integrally formed), the cylinder portion 15A is not limited to a circular cylindrical shape as shown in FIG. 5, and various shapes, such as a quadrangular cylinder, a hexagonal cylinder, can be adopted. Further, the cylinder portion 15A may be arranged such that the side surface 15a1 thereof is connected only with the side plate portions 12, 13, or the cylinder portion 15A may be arranged such that, in a structure provided with limbs 16, 17 for connecting the side plate portions 12, 13 similarly to the above-described embodiment, the cylinder portion 15A is directly connected to (supported by) the side plate portions 12, 13 and also connected to (supported by) the limbs 16, 17. By that the cylinder portion 15A is directly connected to (supported by) the side plate portions 12, 13 in such a manner, the stiffness of the side plate portions 12, 13 supporting the clutch pedal 20 can be further improved by the cylinder portion 15A.

Further, in the present embodiment, plural limbs 16, 17 connected to the pair of side plate portions 12, 13 are provided; the cylinder portion 15 is formed substantially in a cylindrical shape (in the present embodiment, combination of the cylindrical shape of the cylindrical portion 15a and the substantially conical and trapezoidal shape of the substantially conically and trapezoidally shaped portion 15b); and the side surfaces 15a1, 15b1 of the cylinder portion 15 are connected to the limb 16 and the limb 17 across them. Thus, as the cylinder portion 15 connects the limb 16 and the limb 17, the cylinder portion 15 functions as a reinforcing member of the limbs 16, 17 (to be able to increase the strength between the limbs 16, 17), and the stiffness of the pedal support bracket 10 can be improved even in a state of decreasing the number of components, more than in a case of separately providing a cylinder portion and a pedal support bracket.

Still further, in the present embodiment, the cylinder portion 15 is provided with the opening portion 15t opening downward with respect to the vehicle upper and lower direction; the piston 40 is inserted inside the opening portion 15t to be slidable with respect to the cylinder portion 15; and the connecting rod 50 is provided to connect the end portion (the recessed portion 40b) of the piston 40, the end portion being opposite to the direction Z (see FIG. 4) where the piston 40 is inserted into the cylinder portion 15, and the upper portion 20d (the rod holding member 51) of the clutch pedal 20. Thus, even if the pedal support bracket 10 constructs the cylinder portion 15, it is possible to press the piston 40 into the cylinder portion 15 through the connecting rod 50, accompanying a stroke (a pedaling amount) of the clutch pedal 20. In such a manner, it is possible to make a function as a master cylinder effective.

Yet further, in the present embodiment, the projecting portion 20s is formed at the upper end of the clutch pedal 20, and the projecting portion 20s touches the side surface 15b1 of the cylinder portion 15 in a state that the clutch pedal 20 is at the initial position so that the rotation of the clutch pedal 20 is restricted. Thus, it is not particularly necessary to provide a stopper (restricting member) as a separate member to the pedal support bracket like a prior art, and accordingly, it is possible to decrease the number of components even more, and reduce the weight of the clutch pedal device 1.

Incidentally, the present embodiment has been described, taking an example of the clutch pedal device 1 as a vehicular pedal device, however, without being limited thereto, application to a brake pedal device and the like is also possible.

Further, in the present embodiment, limbs are combined substantially on the entire pedal support bracket 10, however, the pedal support bracket 10 may be partially provided with no limbs. For example, the base portion 11 may be formed by a plate member in a shape along the dash panel 2.

Still further, the present embodiment has been described, taking an example of a structure where the paired side plate portions 12, 13 and the cylinder portion 15 are connected by the limbs 16, 17, however, arrangement may be made such that the paired side plate portions 12, 13 and the cylinder portion 15 are not connected, in other words, the pared side plate portions 12, 13 and the cylinder portion 15 are respectively connected to the base portion 11.

Yet further, the thicknesses of the limbs 16, 17 may be different from each other as in the present embodiment (see FIG. 4), and may be the same.

DESCRIPTION OF REFERENCE SYMBOLS

1 . . . clutch pedal device (vehicular pedal device)
2 . . . dash panel
10 . . . pedal support bracket
11 . . . base portion
12, 13 . . . side plate portion
14 . . . connecting portion
15 . . . cylinder portion (master cylinder)

15a . . . cylindrical portion
15a1 . . . side surface
15b . . . substantially conical and trapezoidal shape portion
15b1 . . . side surface
15t . . . opening portion
16, 17, 18 . . . limb (plate shape portion)
20 . . . clutch pedal (pedal)
20d . . . upper portion
20s . . . projecting portion
21 . . . connecting pin (rotation shaft)
40 . . . piston (master cylinder)
40b . . . recessed portion (end portion)
41a, 41b . . . piston packing (master cylinder)
50 . . . connecting rod
S1 . . . driving force source mounting room
S2 . . . vehicle compartment

The invention claimed is:

1. A vehicular pedal device in which a master cylinder is connected to a pedal through a piston to generate hydraulic pressure by movement of the pedal, and is disposed on a vehicle compartment side of a dash panel provided between a driving force source mounting room and a vehicle compartment, comprising:
 a pedal support bracket for supporting the pedal on the dash panel,
 wherein a cylinder portion comprises the pedal support bracket, and stores hydraulic oil of the master cylinder
 wherein the pedal support bracket comprises:
  a pair of side plate portions which sandwich the pedal and support a rotation shaft of the pedal; and
  a connecting portion for connecting the pair of side plate portions,
 wherein the cylinder portion is arranged as at least a part of the connecting portion
 wherein the connecting portion comprises plural plate shaped portions whose both end portions are connected to the pair of side plate portions respectively, and
 wherein the cylinder portion is formed substantially in a circular cylindrical shape, and side surfaces of the cylinder portion are connected across the plural plate shaped portions, or are integrated with the plural plate shaped portions.

2. The vehicular pedal device according to claim 1,
 wherein the cylinder portion is spaced apart from the side plate portions.

3. A vehicular pedal device in which a master cylinder is connected to a pedal through a piston to generate hydraulic pressure by movement of the pedal, and is disposed on a vehicle compartment side of a dash panel provided between a driving force source mounting room and a vehicle compartment, comprising:
 a pedal support bracket for supporting the pedal on the dash panel,
 wherein a cylinder portion comprises the pedal support bracket, and stores hydraulic oil of the master cylinder,
 wherein the cylinder portion is provided with an opening portion that is opened downward in a vehicle upper and lower direction,
 wherein the piston is inserted into the opening portion and is slidable with respect to the cylinder portion, and
 wherein the vehicular pedal device comprises a connecting rod for connecting an end portion of the piston, the end portion being on a side opposite to a direction in which the piston is inserted into the cylinder portion, and an upper portion of the pedal.

4. The vehicular pedal device according to claim 3,
 wherein the connecting rod has spherical portions at both ends thereof,
 wherein one end portion of the connecting rod, the end portion being inserted into the cylinder portion, is held by a recessed portion of the piston, and
 wherein another end portion of the connecting rod, the end portion being on the side opposite to the direction in which the connecting rod is inserted into the cylinder portion, is slidably held by a rod holding member provided on the pedal.

5. A vehicular pedal device in which a master cylinder is connected to a pedal through a piston to generate hydraulic pressure by movement of the pedal, and is disposed on a vehicle compartment side of a dash panel provided between a driving force source mounting room and a vehicle compartment, comprising:
 a pedal support bracket for supporting the pedal on the dash panel,
 wherein a cylinder portion comprises the pedal support bracket, and stores hydraulic oil of the master cylinder,
 wherein the pedal support bracket comprises:
  a pair of side plate portions which sandwich the pedal and support a rotation shaft of the pedal; and
  a connecting portion for connecting the pair of side plate portions,
 wherein the cylinder portion is arranged as at least a part of the connecting portion,
 wherein a projecting portion is provided at an upper end of the pedal, and
 wherein the projecting portion touches a side surface of the cylinder portion at an initial position of the pedal in order to restrict rotation of the pedal.

6. The vehicular pedal device according to claim 5, comprising:
 a return spring for returning the pedal to the initial position,
  wherein the return spring is supported between the projecting portion and the side plate portion.

* * * * *